May 2, 1967  F. J. MITCHELL  3,316,793
CUTLERY RIVET
Filed Sept. 7, 1965

INVENTOR.
FRANK J. MITCHELL
By Christy, Parmelee & Strickland
Attorneys

United States Patent Office 3,316,793
Patented May 2, 1967

3,316,793
CUTLERY RIVET
Frank J. Mitchell, Sherborn, Mass., assignor to Textron Industries, Inc., Providence, R.I., a corporation of Rhode Island
Filed Sept. 7, 1965, Ser. No. 485,429
3 Claims. (Cl. 85—39)

The present invention is concerned with compression rivets, commonly referred to as cutlery rivets, employed in securing a handle to the tang of a knife blade and similar assemblies.

A conventional cutlery rivet is in fact an assembly of a tubular and a solid rivet. The I.D. of the tubular rivet is smaller than the O.D. of the shank of the solid rivet, whereby when assembled under compression the I.D. of the tubular rivet is expanded and the solid rivet is frictionally secured within the tubular rivet.

The present approved practice of assembling the knife tang and handle with conventional cutlery rivets specifies an interference fit between the tubular rivet and the tang. Thus the rivet is held in place only by the frictional fit between the rivet and tang.

Where all elements of such an assembly, including dimensional tolerances, rivet wire hardness and diameter of the hole in the tang, are all held within relatively narrow limits, a satisfactory assembly results. However, the quality of such an assembly is extremely sensitive to small variations in said tolerances.

An object of the invention is to provide an improved assembly of the type described wherein increased dimensional tolerances are acceptable in providing a satisfactory and tight assembly.

Another object of the invention is to provide an improved form of cutlery rivet wherein the two rivet components, when under compression, are deformed and interlocked against separation.

These and other objects of the invention will be made apparent from the following description and the drawing forming a part thereof, wherein.

Figure 1:
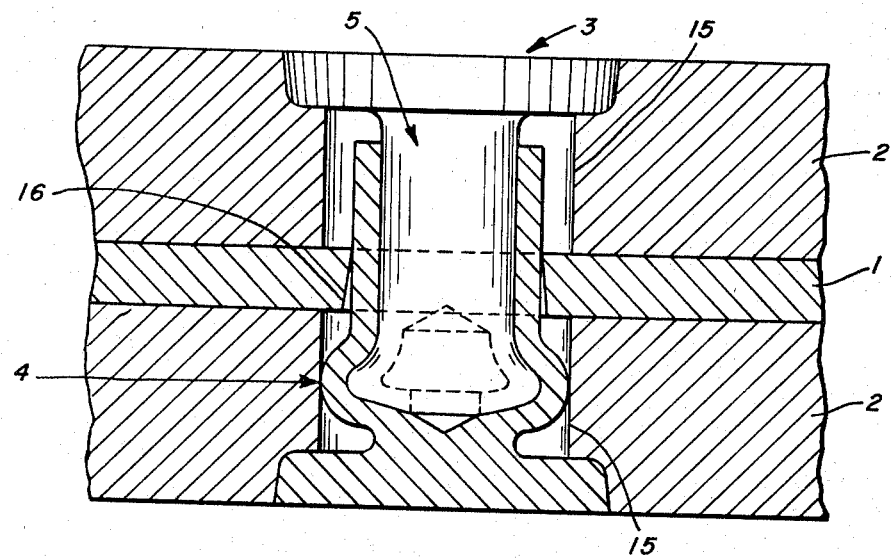
FIG. 1 is a cross-section through an assembly of handle halves, knife tang and the rivet of the invention.

Referring now in detail to the drawing, it will be understood that the tang 1, shown in cross section at FIG. 1, is any suitably shaped extension of the metal knife blade (not shown) and of a size to receive a half section 2 of the handle upon opposite faces of the tang. Conventionally, the tang is of substantially rectangular shape, the handle portion is of suitable shape and material for the purpose and the assembly is completed by at least two rivets spaced longitudinally of the tang and handle portions.

Figure 2:
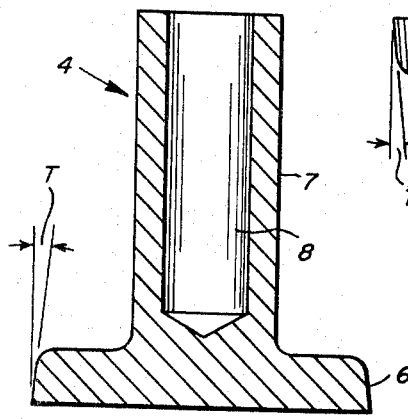
FIG. 2 shows in side elevation the improved tubular rivet member of the assembly.
Figure 3:
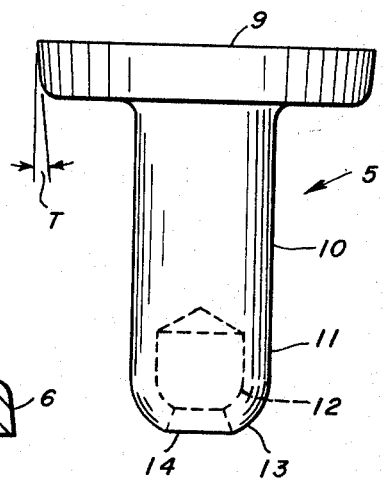
FIG. 3 shows the improved solid rivet of the assembly.

The improved rivet assembly, indicated generally at 3, FIG. 1, comprises a tubular rivet indicated generally as 4, FIG. 2, and a modified solid rivet indicated generally as 5, FIG. 3. The tubular rivet 4 comprises a head portion 6 and a cylindrical shank portion 7, provided with an internal cavity 8. The modified solid rivet 5 comprises a head portion 9 and a shank portion 10. Shank portion 10 is solid except for the outermost portion 11, which is initially straight and provided with an inwardly extending recess 12. Thereafter the shank end is preferably partially crimped over as at 13 to provide a partially closed end 14, for a purpose hereinafter discussed.

The prior art assembly of a tubular and a solid rivet which relied solely upon friction to retain the rivets in assembled relation, required a close tolerance in the assembly to obtain the required friction fit, which friction fit was obtained by driving the larger O.D. shank of the solid rivet into the smaller I.D. of the tubular rivet. Where all tolerances in the rivets and tang openings were within the restricted tolerances, a tight handle resulted.

Figure 4:
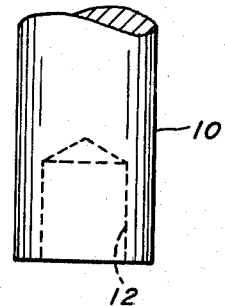
FIG. 4 shows the initial treatment of the shank end of the solid rivet to provide the hollow end thereof.

In the present invention, I do not rely solely upon friction locking, but provide a novel form of expansion of both rivets after the solid rivet has penetrated the tubular rivet past the tang. Referring now to FIGS. 3 and 4 of the drawing, the solid rivet 5 initially has an opening 12 (FIG. 4) formed through the non-headed end of the rivet shank 10, thereafter the said end is rounded as at 13 and partially closes the open end of the rivet shank leaving a smaller opening 14 leading into the larger opening 12. Thus the opening 12 provides relatively thin side-walls for expansion as hereinafter described.

As shown in FIG. 1, the knife blade tang 1 has rivet receiving openings 16 therein for reception of the tubular rivet 4. The handle portions 2 preferably have enlarged openings 15 therein for reception of the rivets, which openings adjacent the outer face of the handle portions are counter-bored to receive the rivet heads 6 and 9. Preferably heads 6 and 9 have a tight fit in said counter-bores for improved appearance, and for this purpose such heads 6 and 9 are provided with tapered peripheries, as at T.

By way of example and not as a limitation, the tubular rivet 4 may have a uniform inside diameter of 0.125″ which is 0.400″ long and the solid rivet may have a shank outside diameter of 0.125″ to 0.130″ which is 0.500″ long. Hence, when shank 10 of solid rivet 5 bottoms against the base of the uniform diameter of the opening in the tubular rivet 4, the extra length of the solid rivet shank 10 expands laterally adjacent the lower end of the shank and correspondingly expands the adjacent side walls of the tubular rivet so as to lock the assembly in fixed relation. As shown in FIG. 1, the openings 15 in handle portions 2 are of sufficient diameter to permit such expansion of the assembled rivets.

It must be understood that, the handle openings 15 must of necessity be larger in diameter than the adjacent unexpanded rivet portions, but need not be of such an exact size as to require contact with the expanded rivet portions. When so assembled, the solid and tubular rivet portions are held in fixed relation at their mutually enlarged portions and do not depend solely upon friction to maintain such fixed relation.

The locking engagement between the shanks of the tubular and solid rivets provides for considerable variation in length and diameter of the respective shanks. This is of considerable importance in maintaining not only a fixed connection between the rivet shanks, but also in maintaining the handle portions 2 in fixed relation to the knife tang portion 1. Thus, should the counter-bore in the handles to receive the rivet head portions 6 and 9 be of excessive depth, or the thickness of handle portions 2 be of over or under tolerance, the rivet shank portions under a lesser or a greater expansion will always provide a fixed locking engagement and maintain a fixed tight assembly of knife handle and tang portions. It will be apparent that a considerable variation in the height or depth of the engaged mushroomed rivet portions will still provide a fixed relation between such portions.

I claim:

1. A rivet for securing a handle upon a knife tang through aligned openings therein comprising, (a) a tubular rivet portion having a hollow shank portion and an enlarged solid head portion, and
(b) a solid rivet portion having a solid shank portion terminating at one end in an enlarged head portion and terminating at the opposite end in a hollowed out portion defined at its outer end by inturned walls terminating in spaced relation to the longitudinal centerline of the shank portion,
(c) said solid rivet shank portion having a length greater than said tubular rivet hollow shank portion whereby when the said rivet shank portions are arranged through opposite sides of said handle and tang openings with the solid rivet shank portion aligned with said tubular rivet hollow shank portion and force applied against the opposite rivet head portions the solid rivet shank hollowed out portion upon bottoming in said tubular rivet hollow shank portion expands about the hollowed out portion thereof to expand and lock both said rivet shank portions in fixed expanded relation.

2. In a two piece cutlery rivet for assembly handle portions upon opposite sides of an intermediate member, wherein said intermediate member and handle portions are provided with concentric rivet receiving openings therethrough with at least one handle portion opening being substantially larger in diameter than the rivet portion to be initially received therein, the combination of
(a) a first member having a tubular shank provided at one end with a laterally extending head portion and at the other end provided with an inwardly extending cylindrical opening terminating adjacent said head portion,
(b) a second member having a cylindrical shank provided at one end with an integral laterally extending head portion and adjacent the other end provided with an inwardly extending initially cylindrical opening whose sidewalls adjacent the outer end of the shank are inturned to partially close said opening and provide an annular bearing surface to engage the inner end of the first member shank opening when the second named member shank is entered into the first member shank opening whereby when said opposite head portions of said members are placed in compression the inner end of said second member shank bearing upon the inner end of the first member opening laterally deforms both members and locks the two rivet shanks into fixed engagement.

3. A cutlery rivet, for pressure assembling of a pair of handle portions upon opposite sides of an intermediate member wherein the intermediate member opening to freely receive the rivet is smaller in diameter than at least one of the handle portion rivet openings, comprising,
(a) a first member having a tubular shank portion provided at one end with a solid head portion projecting laterally therefrom and a cylindrical opening extending through the opposite end of said shank portion to adjacent said head portion,
(b) a second member having a solid tubular shank portion freely receivable in the shank opening of said first member shank opening for bottoming there against,
(c) said second member shank portion having a laterally extending head portion at one end and a suitably shaped indentation through the opposite end thereof, for a portion of the length of the shank, which indentation is partially closed reducing the diameter of the outer end thereof for bearing engagement against the bottom of the first member shank opening for effecting lateral expansion of both the adjacent shank portions above said engaging surfaces when bottoming under pressure in said first member cylindrical opening.

References Cited by the Examiner

UNITED STATES PATENTS

| 2,147,922 | 2/1939 | Reiter | 85—39 |
| 2,237,329 | 4/1941 | Bischof | 85—37 |
| 2,502,267 | 3/1950 | McPherson | 85—38 |
| 2,670,647 | 3/1954 | Jones | 85—39 |
| 2,986,790 | 6/1961 | Silver et al. | 24—219 |
| 2,995,821 | 8/1961 | Gordon | 85—37 |

FOREIGN PATENTS 877,784  9/1942  France.

EDWARD C. ALLEN, *Primary Examiner.*

M. PARSONS, JR., *Assistant Examiner.*